(12) United States Patent
Schierack et al.

(10) Patent No.: US 10,378,830 B2
(45) Date of Patent: Aug. 13, 2019

(54) ENERGY STORAGE DEVICE FOR TEMPORARILY STORING THERMAL ENERGY

(71) Applicants: SOLARWIND POWER SYSTEMS GMBH, Grafschaft (DE); Horst Schierack, Wachtberg (DE)

(72) Inventors: Horst Schierack, Wachtberg (DE); Rainer Holmig, Wurzen (DE)

(73) Assignee: SCHIERACK GREEN TECHNOLOGY GMBH, Grafschaft (DE)

( * ) Notice: Subject to any disclaimer, the term of this patent is extended or adjusted under 35 U.S.C. 154(b) by 222 days.

(21) Appl. No.: 15/323,555

(22) PCT Filed: Jun. 16, 2015

(86) PCT No.: PCT/EP2015/063426
§ 371 (c)(1),
(2) Date: Jan. 3, 2017

(87) PCT Pub. No.: WO2016/000951
PCT Pub. Date: Jan. 7, 2016

(65) Prior Publication Data
US 2017/0234626 A1    Aug. 17, 2017

(30) Foreign Application Priority Data

Jul. 1, 2014    (DE) .................. 10 2014 212 676

(51) Int. Cl.
*F28D 20/00*    (2006.01)

(52) U.S. Cl.
CPC .. *F28D 20/0039* (2013.01); *F28D 2020/0095* (2013.01); *Y02E 60/142* (2013.01)

(58) Field of Classification Search
CPC ......... F28D 20/0039; F28D 2020/0095; Y02E 60/142
See application file for complete search history.

(56) References Cited

U.S. PATENT DOCUMENTS 2,486,833 A * 11/1949 Freund .................. F25B 27/007
126/361.1
4,390,008 A *  6/1983 Andrews ................. F24D 17/02
126/362.1

(Continued)

FOREIGN PATENT DOCUMENTS

DE    2724416 A1    12/1978
DE    3115988 A1     1/1983
(Continued)

OTHER PUBLICATIONS

International Search Report for PCT/EP2015/063426, ISA/EP, Rijswijk, NL, dated Sep. 15, 2015.
(Continued)

*Primary Examiner* — Ljiljana V. Ciric
(74) *Attorney, Agent, or Firm* — Stephen T. Olson; Harness, Dickey & Pierce, P.L.C.

(57) ABSTRACT

An energy storage device for temporarily storing thermal energy includes a closed storage circuit, to which heat can be supplied by a heat source and from which heat can be withdrawn by a heat consumer. A fluid container is divided into a first fluid storage chamber for colder fluid and a second fluid storage chamber for warmer fluid by a displaceable separating element. The closed storage circuit includes at least one pump for conveying fluid from the first fluid storage chamber into the second fluid storage chamber, and/or vice versa. The energy storage device may be incorporated into a power plant.

12 Claims, 2 Drawing Sheets

(56) References Cited

U.S. PATENT DOCUMENTS

| | | | |
|---|---|---|---|
| 4,479,352 A | 10/1984 | Yamaoka et al. | |
| 4,501,262 A * | 2/1985 | Lyon | F24D 17/0021 126/640 |
| 4,523,629 A * | 6/1985 | Copeland | F24D 11/002 126/640 |
| 6,907,923 B2 * | 6/2005 | Sienel | F24D 17/02 122/437 |
| 8,931,277 B2 * | 1/2015 | Peterson | C02F 1/22 60/651 |
| 8,997,511 B2 * | 4/2015 | Berrio | F24D 11/004 62/235.1 |
| 2006/0213502 A1 * | 9/2006 | Baker | F03G 6/02 126/568 |
| 2009/0090109 A1 * | 4/2009 | Mills | F28D 20/0056 60/659 |
| 2010/0290763 A1 * | 11/2010 | Boulay | F24H 1/201 392/451 |
| 2011/0120673 A1 * | 5/2011 | Xiang | C09K 5/063 165/104.25 |
| 2011/0162829 A1 * | 7/2011 | Xiang | C09K 5/063 165/234 |
| 2011/0168159 A1 * | 7/2011 | Lataperez | F24D 11/00 126/400 |
| 2011/0289924 A1 * | 12/2011 | Pietsch | F28D 20/0056 60/682 |
| 2018/0230859 A1 * | 8/2018 | Seidel | F01K 3/18 |
| 2018/0238633 A1 * | 8/2018 | Seidel | F28F 21/04 |
| 2018/0245860 A1 * | 8/2018 | Barmeier | F28D 20/0056 |

FOREIGN PATENT DOCUMENTS

| | | |
|---|---|---|
| DE | 3226334 A1 | 2/1983 |
| DE | 19825677 A1 | 12/1999 |
| DE | 202006014881 U1 | 12/2006 |
| DE | 102010034294 A1 | 2/2012 |

OTHER PUBLICATIONS

Written Opinion of the ISA, ISA/EP, Rijswijk, NL, for PCT/EP2015/063426, dated Sep. 15, 2015.

International Preliminary Report on Patentability, CH. II (with annexes) and English translation of the IPRP, IPEA/EP, Munich, dated Jul. 14, 2016.

* cited by examiner

ENERGY STORAGE DEVICE FOR TEMPORARILY STORING THERMAL ENERGY

CROSS-REFERENCE TO RELATED APPLICATIONS

This application is a 371 U.S. National Stage of International Application No. PCT/EP2015/063426, filed Jun. 16, 2015. This application claims the benefit of and priority to German Patent Application No. 102014212 676.2, filed Jul. 1, 2014. The entire disclosures of the above applications are incorporated herein by reference.

The invention relates to an energy storage device for temporarily storing thermal energy. The invention further relates to a power plant, in particular a solar power plant, wind power plant, or solar-thermal wind power plant, having at least one energy storage device, and a method for operating an energy storage device.

The above-mentioned energy storage device may be used in various fields of application for temporarily storing thermal energy, for example charging with thermal energy during a first time period, and discharging during a second time period following this first time period. By means of the energy storage device, in this regard energy that is provided by a heat source is absorbed during the first time period. During the second time period, the temporarily stored thermal energy is withdrawn in order to supply it to a heat consumer, for example.

In particular, the energy storage device is provided for temporarily storing thermal energy that is available only periodically in order to release it once again when the thermal energy is not available at that moment. For example, the energy storage device is an integral part of a power plant, preferably a power plant for generating power from renewable energy. The power plant may thus be a solar power plant, a wind power plant, or a combination power plant. The latter is understood in particular to mean a solar-thermal wind power plant. This type of power plant has means for generating electrical energy and/or thermal energy from multiple regenerative energy sources, preferably from solar power as well as wind power. The regenerative energy source from which energy may be provided at that moment is preferably used.

It is known to equip a solar power plant with an energy storage device. For example, surplus thermal energy is temporarily stored in a salt storage system. However, this has the disadvantage that the temperature of the storage medium, namely salt, decreases during discharging. Accordingly, the efficiency of the energy generation using the temporarily stored energy continuously drops. While the efficiency may still be satisfactorily high when the energy storage device is full, it is much lower even for a slightly discharged energy storage device due to the fact that the temperature, or a corresponding temperature difference with respect to a lower temperature level, is lowered.

In addition, for an energy storage device of this type, the temperature of the storage medium must be continuously prevented from falling below a minimal allowable temperature. If the temperature falls below this allowable level, the storage medium solidifies, resulting in irreversible damage to the energy storage device. For this reason, it is usually provided to heat the energy storage device at least intermittently, using external heat or external energy, i.e., not solar-generated energy. The external energy is generally provided using fossil fuels, for example natural gas. The salt storage system is thus dependent on the availability of external energy. However, this further reduces the efficiency of the energy storage device. Furthermore, due to the use of fossil fuels, carbon dioxide is released by the heating.

The object of the invention is to propose an energy storage device which has advantages over known energy storage devices, in particular which provides a high storage capacity and at the same time has small space requirements.

This object is achieved according to the invention by an energy storage device having the claimed features. Accordingly, a closed storage circuit is provided, to which heat can be supplied by means of a heat source and from which heat can be withdrawn by means of a heat consumer, and in which a fluid tank is present which is divided into a first fluid storage chamber for colder fluid and a second fluid storage chamber for warmer fluid by means of a displaceable separating element, wherein at least one pump by means of which fluid can be conveyed from the first fluid storage chamber into the second fluid storage chamber, and/or vice versa, is provided in the storage circuit.

The fluid which is conveyed by means of the pump, and which may also be referred to as storage fluid, is present in the closed storage circuit. The fluid container is provided in the storage circuit. The fluid container preferably has a volume that is designed for temporarily storing the desired quantity of energy or heat. In addition to the fluid container, the heat source and the heat consumer are preferably associated with the storage circuit. Thermal energy, i.e., heat, may be introduced into the storage circuit by means of the heat source. In contrast, the heat consumer is used for withdrawing thermal energy, i.e., heat, from the storage circuit. The heat source and the heat consumer may be separate units. However, it may also be provided that the heat source and the heat consumer are formed by a single unit, for example a heat exchanger or the like.

The separating element, which divides the fluid container into the first fluid storage chamber and the second fluid storage chamber, is situated in the fluid container. The separating element is displaceable in such a way that the first fluid storage chamber and the second fluid storage chamber each have a variable volume. In particular, the fluid container itself has a total volume that results from the sum of the volume of the first fluid storage chamber and the volume of the second fluid storage chamber. The first fluid storage chamber is provided for colder fluid, and the second fluid storage chamber is provided for warmer fluid, or vice versa.

This means that in the first time period, during which the storage circuit is supplied with heat by means of the heat source, colder fluid is withdrawn from the first fluid storage chamber and is subsequently heated, i.e., brought to a higher temperature level, by the supplied heat. The heated and thus warmer fluid is subsequently supplied to the second fluid storage chamber. In the process, the separating element is displaced in such a way that the first fluid storage chamber becomes smaller and the second fluid storage chamber becomes larger, in particular by the volume of the withdrawn colder fluid and by the volume of the supplied heated fluid, respectively.

In contrast, if the temporarily stored thermal energy is to be withdrawn, fluid is supplied from the second fluid storage chamber. This fluid is subsequently cooled, i.e., brought to a lower temperature level, by means of the heat consumer. The cooled and thus colder fluid is subsequently supplied to the first fluid storage chamber. In the process, the separating element is displaced in such a way that the first fluid storage chamber becomes larger but the second fluid storage chamber becomes smaller. The first fluid storage chamber is increased in size, and the second fluid storage chamber is decreased in size, by the volume of the withdrawn warmer fluid and by the volume of the supplied cooled fluid, respectively.

The at least one pump is provided for conveying the fluid from the first fluid storage chamber toward the second fluid storage chamber or into the second fluid storage chamber, or vice versa. This pump is present in the closed storage circuit, preferably outside the fluid container. Alternatively, the pump may of course also be integrated into the closed storage circuit.

The fluid container may basically have any given shape. It particularly preferably has a circular cross section along its longitudinal center axis. For example, the longitudinal center axis extends in a straight line, so that the fluid container in this regard is present in the shape of a cylinder, in particular a circular cylinder. However, the longitudinal center axis may also be curved, at least in areas, so that the fluid container has a U shape or an O shape, for example. In the latter case, the fluid container is thus ring-shaped or oval. In the case of the O shape, end-face sides of the fluid container may be situated directly adjacent to one another or spaced apart from one another.

A double U shape or a stadium shape of the fluid container may also be implemented. Two U-shaped partial sections of the fluid container are oppositely situated, so that the free legs of the partial sections protrude toward one another or lie opposite one another, in particular in alignment with one another. At least one pair of the oppositely situated legs may be fluidically connected to one another; this is preferably the case for all oppositely situated legs.

In other words, the fluid container has a stadium shape, having two partial sections with mutually parallel, straight longitudinal center axes. These straight partial sections are connected at their respective closest ends via partial sections of the fluid container, which have curved, in particular partially circular, for example semicircular, longitudinal center axes. The straight partial sections preferably have the same length. This may additionally or alternatively be the case for the curved partial sections.

For the double U shape, it may be provided that only two of the legs of the partial sections are in flow connection with one another, while the other two legs are flow-separated. End-face sides of the flow-separated legs may be situated directly adjacent to one another or spaced apart from one another. In the case of the stadium shape, one of the straight partial sections may be interrupted, so that the two end-face sides are present here as well.

However, it may also be provided that the fluid container is present as an annular chamber, in particular a circular annular chamber. In this case, preferably a plurality of separating elements, in particular at least two separating elements, are situated in the fluid container in order to completely fluidically separate the first fluid storage chamber from the second fluid storage chamber. In the case of the annular chamber, the fluid container has a continuous, i.e., uninterrupted, longitudinal center axis. For example, at least one separating element situated in the fluid container is displaceable, and in particular multiple or all of the plurality of separating elements are displaceably situated in the fluid container. It may also be provided that at least one of the separating elements is stationarily situated in the fluid container, or at least temporarily fixable in the fluid container by means of a suitable device.

The fluid container is particularly preferably designed as an annular chamber with an O shape or double U shape, i.e., stadium shape, of the fluid container. In the case of the double U shape, a separating element is situated, for example, in each of the U-shaped partial sections, at least one of the separating elements, in particular all separating elements, preferably being displaceable. For example, the separating elements are situated in such a way that they are displaceable only in the partial section with which they are associated. In this regard, at least one end stop is provided which prevents the separating elements from passing from the partial section with which they are associated into the respective other partial section. In the case of the stadium shape, it may also be provided that the separating elements are displaceable only in the straight partial sections, and in each case passage into the curved partial sections is prevented, for example by means of the at least one end stop.

The arrangement of the longitudinal center axis is basically arbitrarily selectable. For example, it is horizontally situated, in particular parallel or at least parallel in areas to a subsurface on or beneath which the energy storage device is situated. In principle, however, the longitudinal center axis of the fluid container may be situated at any given angle with respect to the subsurface, in particular an angle of at least 0° and at most 90°. This means that the fluid container or its longitudinal center axis may be situated or oriented vertically. In this case, the longitudinal center axis is situated vertically on the subsurface.

In such an arrangement, it is possible in particular to make use of differences in densities of the fluid between the first fluid storage chamber and the second fluid storage chamber in order to increase the efficiency of the energy storage device. In addition, the vertical arrangement of the fluid container or the corresponding orientation of its longitudinal center axis allows particularly reliable guiding and/or bearing of the separating element.

The fluid may also be arbitrarily selected. However, it preferably has a high heat capacity. For example, water is used as fluid. At least one additive, for example ethylene glycol or the like, may be added to the water. For example, the fluid is present in the fluid container at a pressure that is lower than the critical pressure. Additionally or alternatively, the temperature of the fluid in the storage circuit is always lower than the critical temperature of the fluid. The pressure of the fluid is preferably higher than ambient pressure, and may be, for example, at least 10 bar, at least 25 bar, at least 50 bar, at least 75 bar, or at least 100 bar. The pressure of the fluid may be, for example, at least 25%, at least 50%, at least 75%, or at least 90% of the critical pressure of the fluid. In this regard, the fluid container is present as a fluid pressure vessel.

The maximum temperature of the fluid in the second fluid storage chamber, in particular for a charged heat storage device, may be at least 100° C., at least 150° C., at least 200° C., at least 250° C., or at least 300° C. The temperature of the fluid in the second fluid storage chamber is set, in particular set by control and/or regulation, in such a way that it does not exceed the maximum temperature. The maximum temperature is particularly preferably selected in such a way that that the fluid is liquid, i.e., not vaporized, at the pressure below which it is present in the storage circuit, even at the maximum temperature. The maximum temperature is, for example, at least 50%, at least 75%, at least 80%, at least 85%, at least 90%, or at least 95% of the critical temperature of the fluid.

The described energy storage device has the advantage that it has extremely small space requirements, but at the same time allows a strict separation between colder fluid and warmer fluid. Thus, fluid is not withdrawn from a storage container, subsequently heated, and returned to the storage container, as is frequently the case. In such a procedure, although the thermal energy may also be stored, the temperature of the fluid that is present in the storage container increases only comparatively slowly during the heating by means of the heat source.

If a quantity of heat that is not sufficient for a full charging is now available, the fluid in the storage container cannot be brought to its maximum temperature. As a result, however, the heat consumer can also be supplied only with fluid at a comparatively low temperature. However, typical heat consumers such as heat exchangers or steam turbines operate more efficiently the higher the temperature of the fluid supplied to them, or the greater a temperature difference with respect to a lower temperature level.

This problem is solved with the energy storage device according to the invention, in that the colder fluid is withdrawn from the first fluid storage chamber, heated, and then supplied to the second fluid storage chamber, so that in the latter, fluid is always present at virtually the same temperature to which it has previously been brought by means of the heat source. Thus, no mixing with the colder fluid takes place. Consequently, fluid at the higher temperature is subsequently always available to the heat consumer. For this reason, it is particularly preferably additionally provided that the fluid container is thermally insulated with respect to its external surroundings; i.e., has thermal insulation which preferably completely encloses it.

The described energy storage device allows extremely efficient and cost-effective temporary storage of thermal energy. Due to the essentially constant temperature of the fluid in the second fluid storage chamber, the available enthalpy also remains essentially constant. A high specific storage capacity, based on the volume of the fluid container, is thus achieved, which in turn results in low costs of the energy storage device, based on the capacity in kWh. In addition, it is not necessary to supply external heat to the energy storage device to ensure reliable operation. In this regard, the energy storage device operates in a completely climate-neutral manner, in particular without releasing carbon dioxide.

If the energy storage device is associated with the power plant which is designed as a wind power plant or a combination power plant, means may be provided which convert the electrical energy that is generated by wind power into heat, which is subsequently temporarily stored in the energy storage device.

In another embodiment of the invention, it is provided that the fluid container is present as a pipeline, and the separating element is present as a pig or as a separating disk. The pipeline preferably has the above-described circular cross section with respect to its longitudinal center axis, although the latter may have any given course. In particular, the longitudinal center axis is straight or is curved, at least in areas, so that the pipeline likewise has the above-described U shape or O shape described above.

The fluid container has a volume that corresponds to at least 10%, at least 20%, at least 30%, at least 40%, at least 50%, at least 60%, at least 70%, at least 75%, at least 80%, at least 90%, or at least 95% of the total volume of the closed storage circuit. It is thus particularly preferably provided that a greater fluid volume is present in the fluid container than in other areas of the storage circuit. To make the most favorable use possible of the installation space of the fluid container, the fluid container, i.e., the first fluid storage chamber as well as the second fluid storage chamber, is always at least largely filled, i.e., at least 50%, at least 60%, at least 70%, at least 80%, at least 90%, or at least 95%, or filled completely, with fluid.

In the embodiment of the fluid container as a pipeline, it is preferably also provided that a certain ratio of the length to the width of the fluid container is present. The length of the fluid container is understood to mean its extension in the direction of the longitudinal center axis, while the width describes the dimensions of the fluid container perpendicular to the longitudinal center axis. For example, the fluid container has a circular cross section with respect to the longitudinal center axis. In this case, the width corresponds to the diameter of the fluid container. The width or the diameter along the longitudinal center axis, in particular over the entire length of the fluid container, is preferably constant or at least virtually constant.

The length of the fluid container is preferably much greater than its width. For example, the ratio of the length to the width, or of the length to the diameter, is at least 5, at least 10, at least 15, at least 20, or at least 25. However, the fluid container may of course may have a length that is much greater than that resulting from the mentioned ratios. The fluid container is preferably present as a type of pipeline, i.e., a long section of piping, having a length-to-width ratio or a length-to-diameter ratio of at least 50, at least 75, or at least 100.

If the fluid container is stadium-shaped according to the above discussion, the length of each of the straight partial sections is preferably greater than the length of each of the curved partial sections. For example, the ratio of the length of the straight partial sections to the length of the curved partial sections is at least 2, at least 2.5, at least 5, at least 7.5, or at least 10.

The separating element may be designed as a pig. Pigs are typically used as cleaning or inspection devices for pipelines, in particular gas or crude oil pipelines. The pig in particular fills the entire cross section of the fluid container, and thus separates the first fluid storage chamber from the second fluid storage chamber. The pig is particularly preferably designed for complete or at least virtually complete sealing between the two fluid storage chambers. In this regard, the pig is present as a separation pig.

Alternatively, the separating element may also be designed as a separating disk. The separating disk preferably has two mutually parallel surfaces, one of the surfaces facing the first fluid storage chamber and a second of the surfaces facing the second fluid storage chamber. The separating disk is designed in such a way that the first surface closes off the first fluid storage chamber, and the second surface closes off the second fluid storage chamber, in an essentially tight manner. While the sides or end-face sides of the pig facing the fluid storage chambers may be curved or rounded, the surfaces which may be present as end-face sides of the separating disk are situated in parallel to one another. In this regard, the separating disk is preferably present in the form of a cylinder, in particular a circular cylinder.

The displacement of the separating element or the pig in the fluid container is preferably brought about by means of fluid pressure that is generated by the pump. This means that the separating element moves automatically as soon as fluid is withdrawn from one of the fluid storage chambers and supplied to the other fluid storage chamber. However, it may of course also be provided that the separating element has a drive device or the like which brings about a displacement. In particular, it may be provided that the separating element is used as a pump or as a part of a pump, which in this regard replaces the pump mentioned above.

For example, the separating element has a drive device which displaces the separating element in order to convey the fluid or generate fluid pressure. The drive device may be present on the separating element itself, and may be designed as an electric motor, for example. The drive device is supplied with power in a wired manner, but preferably wirelessly. The drive device may also include at least one magnet, in particular an electromagnet, which is situated inside or outside the fluid container and which brings about a magnetic force on the separating element that is directed toward displacement of the separating element.

When the separating element in such an embodiment is displaced, the volume of one of the fluid storage chambers is decreased, while the volume of the other fluid storage chamber is increased. Correspondingly, the pressure in the first-mentioned fluid storage chamber increases, while it decreases in the latter-mentioned fluid storage chamber. This brings about a flow of the fluid, from the fluid storage chamber in which the higher pressure is present into the fluid storage chamber having the lower pressure.

One preferred embodiment of the invention provides that the separating element is designed for thermally insulating the first fluid storage chamber from the second fluid storage chamber in the manner of a hollow body that is filled with an insulating gas. There is a large temperature difference across the separating element, since the colder fluid adjoins one side of the separating element, and the warmer fluid adjoins the opposite side. To avoid heat losses due to heat transfer, originating from the warmer fluid and going toward the colder fluid, the separating element is provided with thermal insulation.

This thermal insulation is particularly preferably present in the form of a cavity that is filled with the insulating gas. In this regard, the separating element is present as a hollow body. The cavity, viewed in the cross section, preferably extends over the majority of the separating element, and in particular, once again viewed in the cross section, has a surface area that corresponds to at least 50%, at least 60%, at least 70%, at least 80%, at least 90%, or at least 95% of the cross-sectional area of the separating element or of the fluid container.

In principle, any gas may be used as insulating gas. For example, nitrogen, in particular gaseous nitrogen, is used. Alternatively, the cavity may be evacuated so that it is present as a vacuum cavity in the separating element. It may also be provided that multiple fluidically separate, adjacently situated cavities are provided, each of which is either evacuated or filled with the insulating gas.

One refinement of the invention provides that the separating element has at least one sealing lip for fluidically sealing off the first fluid storage chamber from the second fluid storage chamber. To ensure on the other hand the fluidic sealing, and on the other hand ease of displacement of the separating element in the fluid container, the separating element has the sealing lip, which rests in a sealing manner against the inner contour of the fluid container. The sealing lip extends, for example starting from a separating body of the separating element, whereby the above-described hollow chamber in which the insulating gas may be present is particularly preferably provided in the separating body.

The sealing lip particularly preferably completely encloses the separating body in the circumferential direction, i.e., has a continuous design in this direction. As a result, the sealing lip rests continuously against the inner contour of the fluid container in the circumferential direction. It may be provided that only a single sealing lip is present. However, sealing lips, in particular at least two sealing lips, at least three sealing lips, or at least four sealing lips, are particularly preferably provided at a distance from one another in the axial direction. Each of these sealing lips preferably has a continuous design in the circumferential direction, as described above. The two fluid storage chambers are reliably fluidically separated from one another with such an embodiment of the separating element. This also improves the thermal insulation, since mixture of the colder fluid that is present in the first fluid storage chamber with the warmer fluid that is present in the second fluid chamber cannot occur.

One particularly preferred embodiment of the invention provides that the first fluid storage chamber has a first fluid connector and the second fluid storage chamber has a second fluid connector, the heat consumer being connected to the fluid connectors and being fluidically connected in series with the pump, designed as a storage discharge pump. The fluid connectors are used for withdrawing fluid from the fluid container or supplying it to the fluid container. Thus, during charging of the energy storage device, colder fluid is withdrawn from the first fluid storage chamber through the first fluid connector, heated thereby, and subsequently supplied to the second fluid storage chamber through the second fluid connector. In contrast, for discharging, the warmer fluid is withdrawn through the second fluid connector, cooled, and subsequently resupplied to the first fluid storage chamber through the first fluid connector.

The heat source and/or the heat consumer are/is connected to the fluid connectors. In the case of the heat consumer, the above-described pump is designed as a storage discharge pump which is connected in series with the heat consumer. The storage discharge pump is thus used for conveying fluid out of the fluid container through the second fluid connector, then through the heat consumer, and subsequently back into the fluid container through the first fluid connector.

The storage discharge pump and the heat consumer are fluidically provided between the fluid connectors. In other words, the fluid connectors are fluidically connected to one another via the storage discharge pump and the heat consumer. Each of the fluid connectors preferably has a smaller cross section or flow cross section than the fluid container. For example, a fluid line having a smaller cross section than the fluid container or the pipeline is connected to each of the fluid connectors on their side facing away from the fluid container.

In another embodiment of the invention, it is provided that the heat source is connected to the fluid connectors and is fluidically connected in series with a storage charge pump. The heat source may be provided in addition or as an alternative to the embodiment described above. The heat source is present in series with the storage charge pump. The storage charge pump is correspondingly designed for withdrawing fluid from the fluid container through the first fluid connector, conveying it through the heat source, and subsequently resupplying it to the fluid container through the second fluid connector. The storage charge pump as well as the storage discharge pump are particularly preferably present, and may be fluidically situated in parallel to one another.

Lastly, it may be provided that the heat consumer and the storage discharge pump are situated in a first fluid train, and the heat source and the storage charge pump are situated in a second fluid train that is fluidically situated in parallel to the first fluid train. The two fluid connectors of the fluid container are fluidically connected to one another, in each case via the first fluid train and via the second fluid train. Fluid flowing between the fluid connectors may correspondingly flow either through the first fluid train or through the second fluid train. This depends on which of the pumps is operated, or whether heat is to be supplied to or withdrawn from the storage circuit.

Additionally or alternatively, it may be provided that the heat consumer and/or the heat source are/is designed as a heat exchanger. It may be provided that the fluid present in the storage circuit is not used solely for temporarily storing the thermal energy, but is also used, for example, as a working fluid in a working circuit and/or as a solar fluid in a solar circuit. However, it is particularly preferably provided that the storage circuit is completely fluidically separate from the working circuit, the solar circuit, or both. In this regard, for example the heat consumer is designed as a heat exchanger via which the storage circuit is thermally coupled to the working circuit. The working fluid is present in the working circuit. The fluid present in the storage circuit may also be referred to as storage fluid to more clearly differentiate it from the working fluid.

Analogously, the heat source may also be present as a heat exchanger via which the storage circuit is thermally coupled to the solar circuit, for example. The solar fluid is present in the solar circuit.

The invention further relates to a power plant, in particular a solar power plant, wind power plant, or solar thermal-wind power plant, having at least one energy storage device for temporarily storing thermal energy, in particular according to the above discussion. It is provided that the energy storage device has a closed storage circuit to which heat can be supplied by means of a heat source and from which heat can be withdrawn by means of a heat consumer, and in which a fluid container is present which is divided into a first fluid storage chamber for colder fluid and a second fluid storage chamber for warmer fluid by means of a displaceable separating element, wherein at least one pump by means of which fluid can be conveyed from the first fluid storage chamber into the second fluid storage chamber, and/or vice versa, is provided in the storage circuit. The advantages of such a configuration of the energy storage device and of the power plant have been discussed above. The power plant as well as the energy storage device may be refined according to the above discussion, so that in this regard reference is made to same.

In one particularly preferred refinement of the invention, it is provided that the first fluid storage chamber has a first fluid connector and the second fluid storage chamber has a second fluid connector, wherein at least one heat consumer that is connected in series with the pump designed as a storage discharge pump is connected to the fluid connectors, the heat consumer being present as a heat exchanger between the storage circuit and a working circuit having at least one turbine.

As described above, the heat consumer is used for withdrawing heat from the fluid of the storage circuit. The storage discharge pump, which conveys the warmer fluid from the second fluid storage chamber via the heat consumer into the first fluid storage chamber, is operated for this purpose. The heat consumer is designed as a heat exchanger which is used for thermally coupling the storage circuit to the working circuit, in particular as described above. The working fluid present in the working circuit may thus be heated, in particular vaporized and/or superheated, by means of the heat exchanger and the thermal energy present in the storage circuit. The working fluid may subsequently flow through the turbine, and drive it for generating mechanical energy and ultimately electrical energy.

Alternatively, of course, it also possible that the storage circuit is not fluidically separate from the working circuit, or that the working circuit represents a part of the closed storage circuit. In this case, the turbine may be directly supplied with the fluid present in the storage circuit, i.e., storage fluid, by means of the storage discharge pump. The turbine is preferably present in the first fluid train, described above.

Lastly, the invention relates to a method for operating an energy storage device for temporarily storing thermal energy, in particular an energy storage device according to the above discussion. The energy storage device may, for example, be an integral part of a power plant, in particular the power plant described above. It is provided that the energy storage device has a closed storage circuit to which heat can be supplied by means of a heat source and from which heat can be withdrawn by means of a heat consumer, and in which a fluid container is present which is divided into a first fluid storage chamber for colder fluid and a second fluid storage chamber for warmer fluid by means of a displaceable separating element, wherein at least one pump by means of which fluid can be conveyed from the first fluid storage chamber into the second fluid storage chamber, and/or vice versa, is provided in the storage circuit. The energy storage device used for implementing the method is, for example, an integral part of a power plant. With regard to the method, the energy storage device, and the power plant, reference is made to the description below.

The invention is explained in greater detail below with reference to the exemplary embodiments illustrated in the drawings, without hereby limiting the invention. The drawings show the following.

Figure 1:
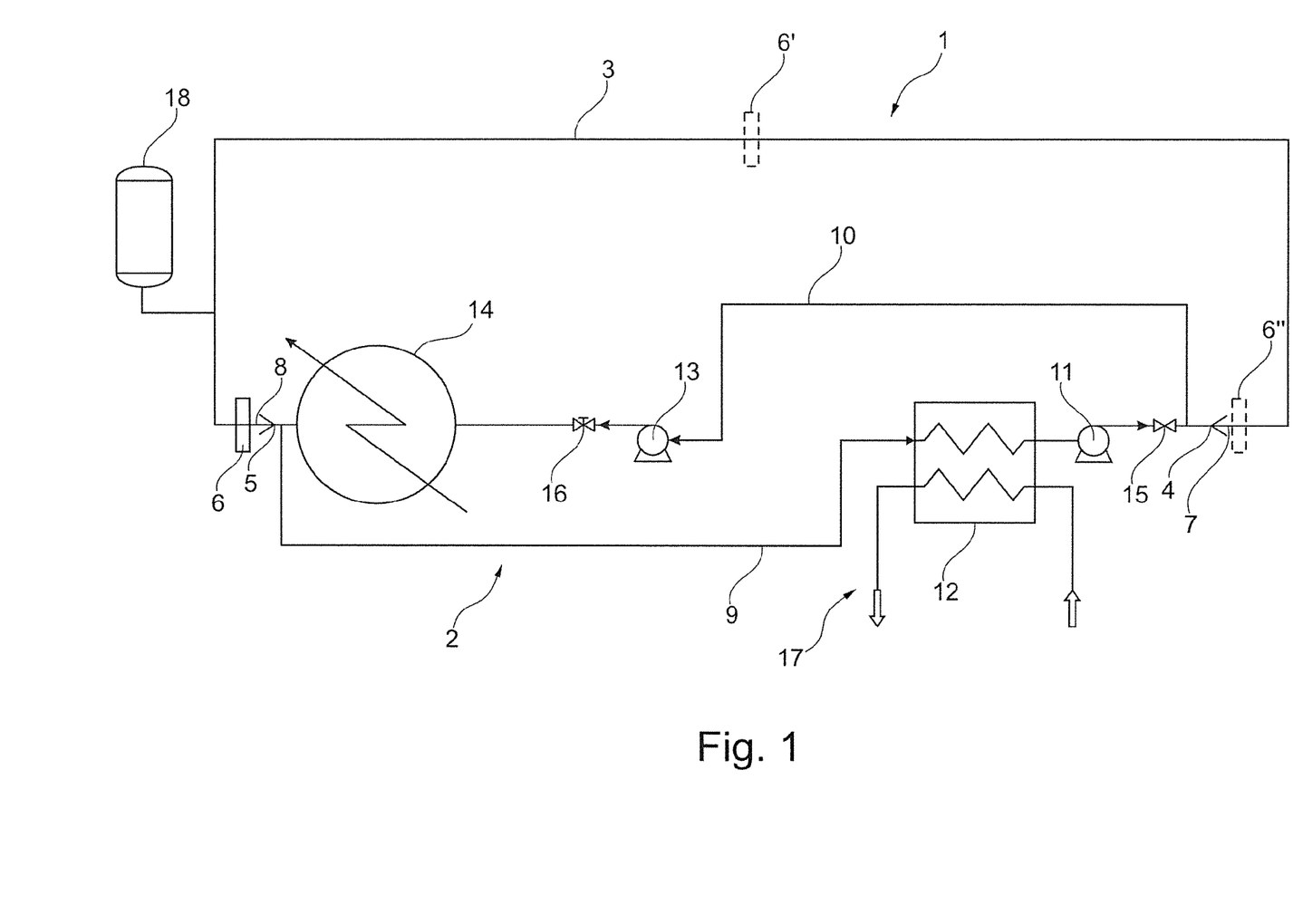
FIG. 1 shows a schematic illustration of a first embodiment of an energy storage device for temporarily storing thermal energy.

FIG. 1 shows a first embodiment of an energy storage device 1 that is used for temporarily storing thermal energy or heat. The energy storage device has a closed storage circuit 2. A fluid container 3, in the present case configured in the form of a pipeline, is provided in the storage circuit 2. The fluid container 3 has a first fluid connector 4 and a second fluid connector 5.

The fluid container 3 or the pipeline which forms the fluid container 3 may basically have any design. It preferably has a circular cross section with respect to its longitudinal center axis, whereby the longitudinal center axis may have any given shape. In the embodiment illustrated here, the longitudinal center axis and thus also the fluid container 3 have a C shape.

In the embodiment illustrated here, the longitudinal center axis of the fluid container 3, not specifically indicated, is preferably horizontal, thus in particular parallel to a subsurface on which or beneath which the energy storage device 1 is situated, at least in areas, in particular completely. In other words, it may be provided that the longitudinal center axis is perpendicular to an influence of gravity or a gravity vector.

The fluid connectors 4 and 5 are preferably recesses in a wall of the fluid container 3 which have much smaller cross-sectional dimensions than the fluid container 3. For example, the fluid connectors 4 and 5 are situated at end-face sides of the fluid container 3 or the pipeline, in particular at opposite end-face sides.

A separating element 6 is displaceably situated in the fluid container 3; other possible arrangements of the separating element 6 are denoted by reference numerals 6' and 6". The separating element 6 divides the fluid container 3 into a first fluid storage chamber 7 and a second fluid storage chamber 8.

A first fluid train 9 and a second fluid train 10 are fluidically connected on the side of the fluid connectors 4 and 5 facing away from the fluid container 3, between the fluid connectors. A pump 11 that is designed as a storage discharge pump, and a heat consumer 12 that is designed as a heat exchanger are present in the first fluid train 9. In contrast, the second fluid train 10 has a pump 13 that is designed as a storage charge pump, and a heat source 14. In addition, a valve 15 or 16 may be associated with the fluid train 9 or 10, respectively.

The heat consumer 12 is used for thermally coupling the storage circuit 2 to a working circuit 17, illustrated here only in part. A working fluid which flows or may flow through the heat consumer 12 or the heat exchanger as well as through a steam turbine is present in the working circuit 17. Of course, it is possible to design the working circuit 17 as part of the storage circuit 2. In this case, the heat consumer 12 is present not as a heat exchanger, but, rather, as a turbine, for example, in order to directly generate mechanical energy or electrical energy with the fluid that is present in the storage circuit 2.

The heat source 14 is likewise designed as a heat exchanger, for example, and is used in particular for thermally coupling the storage circuit 2 to a solar circuit in which preferably at least one solar collector is present. Of course, it may also be provided that the heat source 14 is the at least one solar collector itself, and in this regard the fluid present in the storage circuit 2, which may also be referred to as storage fluid, flows through the at least one solar collector when flow passes through the second fluid train 10. It is also discernible that the storage circuit 2 has at least one compensation tank 18 that is fluidically connected to the fluid container 3, for example.

The separating element 6 is displaceably situated in the fluid container 3, so that the volume of the first fluid storage chamber 7 and the volume of the second fluid storage chamber 8 are variable. In particular, the sum of the volumes of the two fluid storage chambers 7 and 8, but independently of the position of the separating element 6, is always the total volume of the fluid container 3 that is available for accommodating the fluid or storage fluid.

Either charging, i.e., the supplying of thermal energy, or discharging, i.e., the withdrawal of thermal energy, may be provided during operation of the energy storage device 1. For charging the energy storage device 1 with thermal energy, the storage charge pump 13 is operated so that fluid is conveyed along the second fluid train 10. The valve 16 is opened for this purpose. The valve 15 is preferably closed at the same time.

The separating element 6 is initially in the position indicated by reference numeral 6. By operation of the storage charge pump 13, the fluid is withdrawn from the first fluid storage chamber 7 and pumped through the heat source 14 into the second fluid storage chamber 8. The separating element 6 is displaced on account of the pressure difference that develops in the fluid storage chambers 7 and 8. The volume of the second fluid storage chamber 8 correspondingly increases, while the volume of the first fluid storage chamber 7 decreases. The separating element 6 is thus displaced in the direction of the positions indicated by reference numerals 6' and 6".

The storage charge pump 13 is preferably operated for as long as heat or thermal energy can be provided by means of the heat source 14, or until the energy storage device 1 is maximally charged with thermal energy, i.e., all of the fluid present in the fluid container 3 has reached the maximum temperature. In the latter case, the separating element 6 is in the position indicated by reference numeral 6". The storage charge pump 13 is now switched off, and the valve 16 is preferably closed.

If the temporarily stored thermal energy is now to be withdrawn from the energy storage device 1, the storage discharge pump 11 is operated and the valve 15 is opened. At the same time, the valve 16 is preferably closed if this is not already the case. By operation of the storage discharge pump 11, fluid is withdrawn from the second fluid storage chamber 8 and conveyed through the heat consumer 12 into the fluid storage chamber 7. Correspondingly, the volume of the first fluid storage chamber 7 and the volume of the second fluid storage chamber 8 are now changed conversely with respect to the previous discussion.

The fluid withdrawn from the second fluid storage chamber 8 is cooled in the heat consumer 12. The heat withdrawn from the fluid is used for heating, in particular vaporizing and/or superheating, the working fluid present in the working circuit 7. The heated working fluid may subsequently be used for generating mechanical energy and ultimately electrical energy. Discharging of the energy storage device 1 takes place, for example, for as long as the heat consumer 12 needs thermal energy, or until the second fluid storage chamber 8 is completely empty, i.e., the separating element 6 is in the position indicated by reference numeral 6.

Such an embodiment of the energy storage device 1 has the advantage that the installation space of the fluid container 3 is comparatively small. In particular, it is not necessary to keep an empty storage container on hand for receiving the heated or cooled fluid. At the same time, the separating element 6 allows complete or at least virtually complete separation of the colder fluid, present in the first fluid storage chamber 7, from the warmer fluid present in the second fluid storage chamber 8. Mixture of the warmer fluid with the colder fluid and accompanying cooling are thus avoided. Correspondingly, the warmer fluid is always available at a high temperature, which allows operation of the working circuit 17 with high efficiency.

Figure 2:
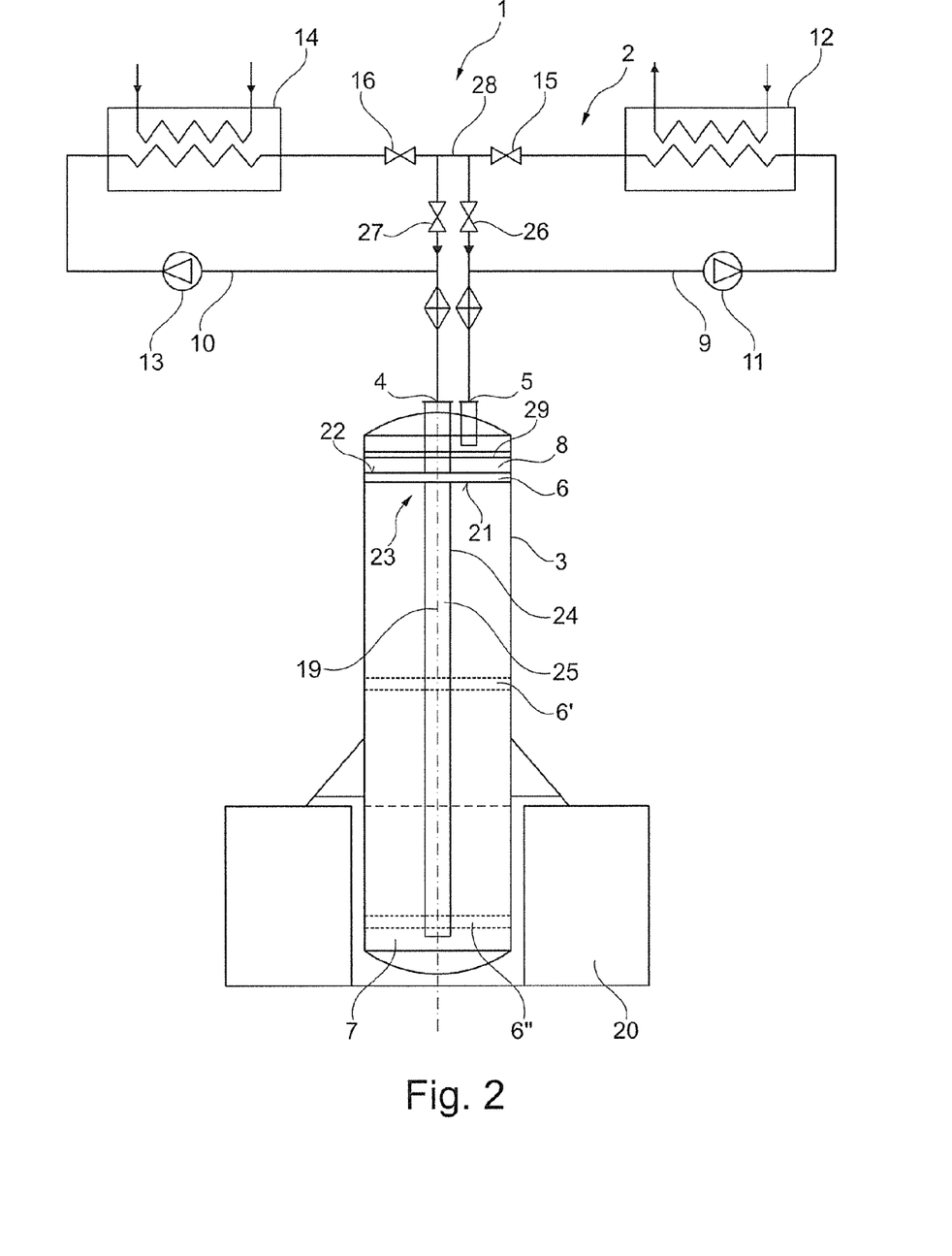
FIG. 2 shows a schematic illustration of a second embodiment of the energy storage device.

FIG. 2 shows a second embodiment of the energy storage device 1. Reference is basically made to the above discussion of the first embodiment. The differences from same are addressed below. One important difference is that the longitudinal center axis 19 of the fluid container 3 is vertical, in particular thus perpendicular to the subsurface mentioned above. For example, the longitudinal center axis 19 extends in parallel to the influence of gravity or the gravity vector.

In this regard, the height of the fluid container 3 is, for example, greater than its width and/or its depth, in particular greater than its diameter. In such an embodiment, the longitudinal center axis 19 preferably extends in a straight line, so that the fluid container 3 or its longitudinal center axis preferably is not curved. The fluid container 3 may be secured by means of a foundation 20, for example. The fluid container may be situated aboveground, in particular completely aboveground, or alternatively underground, in particular completely underground.

The separating element 6 is formed, for example, by a separating disk which is preferably circular. The separating disk has, for example, a first surface 21 and a second surface 22 opposite from the first surface. The first surface 21 faces the first fluid storage chamber 7, and the second surface 22 faces the second fluid storage chamber 8. The surfaces 21 and 22 preferably extend in parallel to one another, in particular over the entire cross section of the fluid container 3.

A bearing 23 is provided to ensure particularly reliable guiding of the separating element 6. A recess, in particular a central recess, in the separating element 6, and a guide element 24 are associated with the bearing 23. The guide element 24 is, for example, centrally situated in the fluid container 3 and passes, preferably largely or even completely, through same in the longitudinal direction thereof. The former is understood to mean a longitudinal extension of the guide element 24 which preferably corresponds to at least 80%, at least 85%, at least 90%, or at least 95% of the longitudinal extension of the fluid container 3 or to the height of the fluid container 3.

In the present exemplary embodiment, the guide element 24 is formed by a pipe 25 via which a fluid connection between the fluid storage chamber 7 and the fluid connector 4 is established. The fluid connector 4 thus opens directly into the fluid storage chamber 7 via the pipe 25. In contrast, the fluid connector 5 opens directly into the fluid storage chamber 8. By means of the pipe 25, the fluid connectors 4 and 5 may be situated on the same end-face side of the fluid container 3.

As explained above for the first embodiment, the fluid connectors 4 and 5 are flow-connected or flow-connectable to one another via the first fluid train 9 and via the second fluid train 10. Valves 26 and 27 may be provided in addition to valves 15 and 16. For charging the energy storage device, it is provided, for example, to convey fluid from the first fluid storage chamber 7 in the direction of the heat source 14 or through same by means of the pump 13, and subsequently to supply the fluid to the second fluid storage chamber 8 via the fluid connector 5. For this purpose, the valves 16 and 26 are open, while the valves 15 and 27 are closed.

In contrast, to discharge the energy storage device 1, fluid is conveyed from the second fluid storage chamber 8 in the direction of the heat consumer 12 or through same, and subsequently supplied to the first fluid storage chamber 7 via the fluid connector 4, by means of the pump 11. For example, the valves 15 and 27 are open, while the valves 16 and 26 are preferably closed.

To allow appropriate flow control, the fluid trains 9 and 10 meet one another at an intersection point 28. The valve 15 is fluidically situated between the intersection point 28 and the heat consumer 12, while the valve 16 is fluidically situated between the intersection point 28 and the heat source 14. In addition, the valve 26 is fluidically situated between the intersection point 28 and the fluid connector 5, and the valve 27 is fluidically situated between the intersection point 28 and the fluid connector 4. In this regard, the desired flow for selectively charging and discharging the energy storage device 1 may be achieved by means of the above-described arrangement and switching of the valves 15, 16, 26, and 27.

To ensure reliable flow control of the fluid within the fluid container 3, a baffle plate 29 or a baffle cage may be fluidically provided between the fluid connector 5 and the fluid storage chamber 8, through which the fluid that is introduced into the fluid storage chamber 8 flows. The baffle plate or the baffle cage is formed by a partition wall, for example, that is perforated and in this regard has flow openings for the fluid.

With the second embodiment of the energy storage device 1 presented here, basically the same advantages may be achieved as with the first embodiment. Due to the vertical arrangement of the fluid container 3, the energy storage device 1 may be implemented with a particularly small base surface. In addition, use may be made of differences in densities of the colder fluid in the first fluid storage chamber 7 and the warmer fluid in the second fluid storage chamber 8 during charging and/or discharging of the energy storage device 1.

The invention claimed is:

1. An energy storage device for temporarily storing thermal energy, the energy storage device comprising:
   a closed storage circuit heatable by a heat source and from which heat is withdrawn by a heat consumer;
   a fluid container divided into a first fluid storage chamber for colder fluid and a second fluid storage chamber for warmer fluid by a displaceable separating element; and
   at least one pump in the storage circuit for conveying fluid from the first fluid storage chamber into the second fluid storage chamber, and/or vice versa, is provided in the storage circuit;
   wherein the fluid container has at least a portion with a longitudinal center axis that is curved, and has a length-to-width ratio of at least five.

2. The energy storage device according to claim 1, wherein the separating element is a pig or a separating disk.

3. The energy storage device according to claim 1, wherein the separating element thermally insulates the first fluid storage chamber from the second fluid storage chamber.

4. The energy storage device according to claim 1, wherein the separating element has at least one sealing lip for fluidically sealing off the first fluid storage chamber from the second fluid storage chamber.

5. The energy storage device according to claim 1, wherein the first fluid storage chamber has a first fluid connector and the second fluid storage chamber has a second fluid connector, the heat consumer being connected to the fluid connectors and being fluidically connected in series with the pump, the heat consumer being a storage discharge pump.

6. The energy storage device according to claim 1, wherein the heat source is connected to the fluid connectors, and is fluidically connected in series with a storage charge pump.

7. The energy storage device according to claim 1, wherein the heat consumer and a storage discharge pump are situated in a first fluid path, and the heat source and a storage charge pump are situated in a second fluid path that is fluidically situated in parallel to the first fluid path.

8. The energy storage device of claim 1, in combination with a power plant, the power plant selected from the group consisting of a solar power plant, a wind power plant, and a solar thermal-wind power plant.

9. The energy storage device of claim 8, wherein the first fluid storage chamber has a first fluid connector and the second fluid storage chamber has a second fluid connector, wherein at least one heat consumer connected in series with the pump is a storage discharge pump connected to the fluid connectors, the heat consumer being a heat exchanger between the storage circuit and a working circuit having at least one turbine.

10. The energy storage device of claim 1, wherein the fluid container has a length extending in a direction of the longitudinal center axis and a width perpendicular to the length.

11. The energy storage device of claim 1, wherein the fluid container has a length-to-width ratio of at least 5.

12. The energy storage device of claim 1, wherein the fluid container is a section of piping having a length-to-diameter ratio of at least 50.

* * * * *